United States Patent
Haggata et al.

(10) Patent No.: US 7,722,715 B2
(45) Date of Patent: May 25, 2010

(54) PIGMENT COMPOSITIONS FOR INKS WITH IMPROVED RHEOLOGY

(75) Inventors: Stephen Haggata, Glasgow (GB); Iain Frank Fraser, Kilbirnie (GB); Stephen John Coughlin, Muirhead (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 769 days.

(21) Appl. No.: 11/547,213

(22) PCT Filed: Mar. 30, 2005

(86) PCT No.: PCT/EP2005/051428

§ 371 (c)(1),
(2), (4) Date: Sep. 29, 2006

(87) PCT Pub. No.: WO2005/097914

PCT Pub. Date: Oct. 20, 2005

(65) Prior Publication Data

US 2008/0271635 A1 Nov. 6, 2008

(30) Foreign Application Priority Data

Apr. 6, 2004 (EP) .................... 04101410

(51) Int. Cl.
*C09B 67/18* (2006.01)
*C09D 11/02* (2006.01)

(52) U.S. Cl. .............. 106/493; 106/31.6; 106/410; 106/411; 106/412; 106/413; 106/494; 106/495; 106/496; 106/497; 106/498; 106/499

(58) Field of Classification Search ........... 106/410, 106/411, 412, 413, 493, 494, 495, 496, 497, 106/498, 499
See application file for complete search history.

(56) References Cited

U.S. PATENT DOCUMENTS

| 4,515,639 A | 5/1985 | Dopfer et al. ............. 106/288 |
| 5,382,288 A | 1/1995 | Schenk et al. ............. 106/496 |
| 5,482,548 A | 1/1996 | Stirling et al. ............. 106/496 |
| 5,672,202 A | 9/1997 | Stirling et al. ............. 106/496 |
| 5,728,206 A | 3/1998 | Badejo ........................ 106/493 |
| 5,741,356 A | 4/1998 | Badejo et al. ............. 106/493 |

FOREIGN PATENT DOCUMENTS

| EP | 0 062 304 | 10/1982 |
| FR | 2 048 418 | 3/1971 |
| GB | 1080115 | 8/1967 |
| GB | 1156835 | 7/1969 |
| JP | 63-191871 A * | 8/1988 |
| WO | WO99/23172 A1 * | 5/1999 |

OTHER PUBLICATIONS

Translation of French Patent Application No. FR2048418 (Mar. 1971).*
Translation of Japanese Patent Application No. JP63-191871A (Aug. 1988).*
English Language Derwent Abstract AN 1992-413106 [50] for RO 101329 (May 30, 1991).
English Language Abstract printed from esp@cenet.com for EP 0 062 304 on Jan. 16, 2007.

* cited by examiner

*Primary Examiner*—Anthony J Green
(74) *Attorney, Agent, or Firm*—Joseph C. Suhadolnik

(57) ABSTRACT

A process for the preparation of pigment compositions which give improved ink flow is provided which comprises treating the pigment, during the pigment synthesis, with a small amount of a long chain aliphatic amine. The pigment compositions obtained can be used for preparing millbase inks which due to their improved flow viscosity (rheology) at high pigmentation can be easily handled as well as flexibly formulated, e.g. a number of final printing inks for different ink applications can be manufactured from a single millbase in a very economical manner. The final inks are preferably used in packaging gravure printing processes.

10 Claims, No Drawings

PIGMENT COMPOSITIONS FOR INKS WITH IMPROVED RHEOLOGY

The present invention relates to the preparation of organic pigment compositions which impart improved rheology to ink concentrates which can be used e.g. for preparing printing inks.

Previous developments of pigment-based liquid inks, e.g. C.I. Pigment Red 57:1 based packaging gravure inks, which impart improved millbase flow viscosity at high millbase pigmentation have usually coincided with large pigment primary crystal size and related colouristic traits in the final ink, e.g. high opacity and low colour strength, which is not favourable for many printing ink applications.

Improved millbase flow, however, is of great help to the ink manufacturer when addressing the following issues:

Pumping of millbase inks of high pigmentation: giving high throughput, thus saving time and money.

Increased range of flexibility when reducing the millbase ink down to final printing ink.

The higher the pigmentation in the millbase ink, the more flexible the ink manufacturer can be in choosing the reduction varnish component. Therefore, a number of final inks for different ink applications can be manufactured from a single millbase in shorter times and at lower costs.

Many attempts have been made in the past to facilitate the dispersing and grinding of pigments by adding chemical agents to the pigment compositions.

A two-step method for the preparation of the azo pigment C.I. 12120 is disclosed in RO 101 329 using a treatment with amines or amides in a first step, followed by a further treatment with an amide. FR 2 048 418 discloses a method of treating pigment compositions with long chain aliphatic amines, preferably diamines, in combination with long chain aliphatic carboxylic acids forming water insoluble salts with the amine. Pigments treated with such salts still need grinding for a comparatively long time in order to develop satisfactory colouring properties and degree of dispersion. EP 0 651 052 discloses diarylide pigment compositions treated with an amine in combination with inorganic compounds in order to improve gloss and the tinctorial value in gravure inks. EP 0 761 769 discloses diarylide pigment compositions treated with a combination of a long chain aliphatic primary amine, an ethylene polyamine and a propylene triamine, resulting in improved strength, gloss and transparency of gravure inks. A further use of long chain aliphatic amines in combination with polyamines for the preparation of diarylide pigments is described in EP 0 062 304. In EP 0 567 918 there are disclosed azo pigment compositions obtained by treatment of the pigment with a combination of amides, diamines and long chain aliphatic amines. Further azo pigment compositions are disclosed in EP 0 057 880, treated with long chain aliphatic amines and diamines in combination.

In GB 1 080 115 there is disclosed a method of producing easily dispersible pigments by adding large amounts of a long chain aliphatic amine to a pigment slurry and effecting "flushing" (transfer of the pigment from the aqueous phase to the organic (amine) phase by heat treatment of the slurry for several hours (time to flush). However, pigments treated with such high amounts of amines also have their problems with regard to the printing performances of their corresponding printing inks. GB 1 156 835 describes a process for producing easily dispersible pigments by contacting the pigment with a triamine for several hours. As a consequence of the use of triamines, the equivalent amount of amino groups relative to the molar amount of pigment remains high.

However, the rheology of the prior art is not fully satisfactory. It has now been found that in particular the problems of low millbase flow can be overcome by the objects of the present invention, the main object being a process for preparing metal containing organic pigment compositions by treating the pigment with a very small amount of a long chain aliphatic amine (no "flushing"). This treatment is performed for a very short time resulting in pigment preparations, which lead to millbase inks with remarkably improved flow viscosities at high millbase pigmentation and further to final printing inks that produce prints of outstanding colour strength, gloss and transparency.

Further objects of the present invention are the millbase inks, the final printing inks, processes for their preparation and their uses. These and other objects of the present invention will be described in the following.

Therefore, in a first aspect of the present invention there is provided a process for the preparation of a metal containing organic pigment composition which comprises treating the pigment, before isolation and drying, with 0.1 to 7.5% by weight, based on the calculated weight of the pigment to be obtained, of an aliphatic amine with from 6 to 22 carbon atoms in the aliphatic chain, wholly or partly as the free base, and thereafter isolating and drying the composition. In cases when the aliphatic amine has more than one amino group, said aliphatic amine is present in an amount of less than 4% by weight, based on the calculated weight of the pigment to be obtained.

The pigment compositions obtained according to the inventive process are a further object of the present invention.

The pigments as a rule, are compatible with the other components of the inventive ink compositions and constitute the basis (colourant) for forming the printing inks.

Metal containing organic pigments comprise such as, but not exclusively, nonoazo, azomethine, phthalein, anthraquinone, phthalocyanine, or triphenylmethane metal complex pigments. Mixtures of the pigments may also be used.

Preferred metal containing organic pigments are the azo metal complexes, azomethine metal complexes, or metal containing phthalocyanines, or mixtures thereof.

The most preferred metal containing organic pigments are the monoazo metal complexes (azo pigment lakes) comprising such as, but not exclusively, β-naphthol, 2-hydroxy-3-carboxy naphthalene (BONA), naphthol AS or naphthalene sulfonic acid pigment lakes, or mixtures thereof.

Preferred blue or green pigments are unsubstituted or halogenated metal phthalocyanines, such as copper phthalocyanine pigments (e.g. C.I. Pigment Blue 15:3), while the red pigments are e.g. the naphthol pigments, preferably β-naphthol or 2-hydroxy-3-carboxy naphthalene (BONA) metal salt pigments including e.g. the C.I. Pigment Reds 48, 57, 52, 53 and 63.

For further details as to all these organic pigments reference is made to *Industrial Organic Pigments*, W. Herbst, K. Hunger, $2^{nd}$ Edition, VCH Verlagsgesellschaft, Weinheim, 1997.

The long chain aliphatic amines comprise e.g. saturated or unsaturated fatty amines of from 6 to 22, preferably from 8 to 18 carbon atoms, in the aliphatic chains, or mixtures thereof.

Examples of saturated amines are hexylamine, octylamine, decylamine, dodecylamine (laurylamine), tetradecylamine, hexadecylamine (palmitylamine), octadecylamile (stearylamine), eicosylamine ($C_{20}$) (arachidylamine) and docosylamine ($C_{22}$) (behenylamine).

The unsaturated amines may contain 1 to 3 double bonds and comprise e.g. oleyl amine ($C_{18}H_{35}NH_2$), linoleyl amine ($C_{18}H_{33}NH_2$), and linolenyl amine ($C_{18}H_{31}NH_2$). Further, e.g. distearylamine, dipalmitylamine or dioleylamine.

Available commercial products are e.g. cocoamine (mixture of $C_8$-$C_{18}$ primary aminos—Armeen® C (Akzo Nobel)), tallowamine (mixture of $C_{12}$-$C_{18}$ primary amines—Armeen® HT) and oleylamine (mixture of $C_{12}$-$C_{18}$ primary amines—Armeen® O).

Instead of a monoamine as listed above or in combination therewith, a long chain aliphatic diamine or triamine may also be used, provided that it is present in an amount of less than 4% by weight, based on the calculated weight of the pigment to be obtained. Available commercial products are e.g. tallowpropylenediamine (Duomeen® T) and oleyl dipropylene triamine (Triameen® OV).

The general process features of the inventive process for the preparation of metal containing organic pigment compositions are provided for the case of manufacture of C.I. Pigment Red 57:1
(2-Naphthalenecarboxylic acid-3-hydroxy-4-[(4-methyl-2-sulphophenyl)azo]-calcium salt (1:1)).

The sodium dyestuff of C.I. Pigment Red 57:1 is a product of an aqueous coupling reaction between a diazonium salt and a coupling component. The diazoniutm salt is formed from the diazotisation of 2-amino-5-methyl-benzenesulphonic acid (trade name: 4B acid), which is then reacted with the coupling component, in this case, 2-hydroxy-3-carboxynaphthalene (BONA). The diazonium salt of 4B acid and the coupling component are reacted to form the sodium dyestuff to which calcium chloride is added to form the precipitated calcium pigment. In this case C.I. Pigment Red 57:1 is formed.

The synthesis is preferably carried out in the presence of resin but may also involve the addition of the resin to the aqueous pigment slurry after the pigment has been formed.

The resins suitable for use in this process include rosin, the principal component of which is abietic acid; chemically modified rosins such as hydrogenated, dehydrogenated or disproportionated rosin; dimerised or polymerized rosin; partially esterified rosin; non-esterified rosin; non-esterified or partially esterified fumaric, maleic or phenolic modified rosin; and mixtures thereof. The resin level used in the process is typically in the region of 1% to 30% but preferably in the region of 3% to 10%.

The pigment products produced from these coupling reactions with resin are termed 'resinated pigment slurry'.

Addition of a shading agent, such as C.I. Pigment Red 63:1 is optional. The shading agent can be manufactured in situ in the pigment synthesis or added as preformed slurry or as presscake or as a dry blend. A further option is to include a second (or more) 'naphthol based' coupling component along with the BONA.

If a shading agent is present, the weight ratios of C.I. Pigment 57:1 to the shading agent are typically from 90%: 10% to 99.9%:0.1% respectively, but preferably from 95%: 5% to 99%:1%. If an additional naphthol based coupling component is present, the ratios of BONA to this component are typically from 85%:15% to 99.9%:0.1%, but preferably from 95%:5% to 99%:1%.

Examples of a standard process for the synthesis of the resinated pigment slurry are detailed in the Examples 1 and 6. The resinated pigment slurry is typically of 1% to 15% concentration after synthesis but preferably 1% to 6%.

Amine solution is added to the aqueous resinated pigment slurry from pH 5-12, preferably pH 6-10 as an aftertreatment. The level of amine added to the resinated pigment slurry is typically from 0.1% to 7.5% by weight, but preferably from 0.5% to 4% by weight and most preferably from 0.5% to 3% by weight, based on the calculated weight of the pigment to be obtained. When the amine has more than one amino group, the amount of amine added is less than 4% by weight, based on the calculated weight of the pigment to be obtained.

In a preferred mode of operation, the amine treatment consists of adding to the aqueous resinated pigment slurry, before isolation and drying, a monoamine typically from 0.1% to 7.5% by weight, but preferably from 0.5% to 4% by weight and most preferably from 0.5% to 3% by weight, based on the calculated weight of the pigment to be obtained.

The amines can be added to the resinated pigment slurry in form of their water-soluble salts, such as chlorides or acetates, or as the free amine either in neat form or as an aqueous dispersion. The pigment slurry mixture is then stirred for 30 seconds to 24 hours, typically 1 minute to 60 minutes but preferably 5 minutes to 30 minutes and most preferably 10 to 20 minutes. The slurry mixture can optionally be heated to an elevated temperature while stirring, typically to 40° C. to 95° C., but preferably to 60° C. to 90° C.

The isolation of the pigment slurry is carried out by filtration and washing with water to remove salts, such as chlorides and acetates, from the slurry, followed by isolation of presscake which is typically 20% to 40% solids content and 80% to 60% water, but preferably 25% to 35% solids content and 75% to 65% water. The presscake is then optionally granulated. The presscake granules are then dried at a temperature of 90° C. to 120° C. The dried product can be isolated as granules or milled to powder form.

The dispersion of the pigment product by the ink manufacturer can be carried out in a variety of different varnish systems and applications.

A particularly preferred embodiment for this invention is to react 2-amino-5-methyl benzenesulphonic acid (4B Acid) and 2-aminonaphthalene sulphonic acid (Tobias acid) diazonium salts with a solution of 2-hydroxy-3-carboxy-naphthalene (BONA) in the presence of fumarated rosin. The 4B acid/Tobias acid weight ratio is typically from 90% 10% to 99.9%:0.1% respectively but preferably from 95%:5% to 99%:1%.

The dyestuff slurry is then laked with calcium chloride after coupling. The pH is adjusted to pH 9.0 after laking and then a solution of acetic acid/long chain aliphatic amine (3% long chain aliphatic amine by weight, based on the calculated weight of the pigment to be obtained) is added to the slurry. The final pH reaches pH 7.0-7.5 at which point the slurry is heated to 75° C., held at temperature for 10-30 minutes and then filtered, washed, granulated and dried.

This pigment product can also be prepared as dry lump or powder. The use of granules is currently preferred due to the lower dusting of this pigment form.

This pigment product produced via the described process leads to surprising advantages regarding millbase ink viscosity when the pigment is dispersed into the varnish medium.

An 'ink concentrate' or 'millbase ink' is usually prepared prior to the 'final ink preparation by incorporating the pigment compositions into printing ink varnish/solvent combinations by a variety of shear inducing methods, such as mixing, bead-milling, triple-roll milling, kneading and extrusion.

Examples of typical methodology are triple roll mill, horizontal or vertical bead mill, cobra mill, Z-blade mixer or kneader, single, twin or triple screw extruder and also a Müller glass plate dispersion apparatus.

For millbase inks, e.g. of packaging gravure inks, pigment loadings can cover a range from 15% to 40% and preferably from 18% to 35% by weight of the millbase ink.

After the millbase ink is sieved, the ink is diluted to the 'final printing ink' composition. Pigment loadings of the final printing inks can cover a range from 1% to 15%, but preferably from 6% to 12% by weight on the final ink.

For both the millbase inks ('ink concentrate') and the final inks (ready-to-use printing inks), e.g. packaging gravure inks, which are further objects of the present invention, there are a number of different solvent systems used in the market.

The composition of a packaging gravure system, in particular a nitrocellulose/solvent varnish system, can vary from alcohol rich to ester rich (encompassing nitrocellulose dissolved in either pure alcohol, pure ester or mixtures thereof). The alcohol used is generally an aliphatic alcohol, preferably ethanol, but may also be a higher boiling solvent such as ethoxypropanol. The ester is generally ethyl acetate.

Full details of the application can be found in "The Printing Ink Manual, 5$^{th}$ Ed, edited by R. H. Leach and R. J. Pierce, 1993, Blueprint (Chapman and Hall), ch. 9, p 547-598".

Unless otherwise indicated, the evaluations described in the present invention are carried out in nitrocellulose/ethanol/ethylacetate based systems. The nitrocellulose resin can vary in both viscosity and nitration level.

Other systems commonly used in liquid packaging ink formulations are PVB (polyvinyl butyrate) and PA (polyamide). Typical manufacture of inks/varnishes can also be found in "The Printing Ink Manual, p 715-765".

For the preparation of packaging gravure inks, a beadmill dispersion method is generally used.

The final printing inks may in addition comprise customary additives known to those skilled in the art.

Typical additives include drying enhancers, drying inhibitors, non-coloured extenders, fillers, opacifiers, antioxidants, waxes, oils, surfactants, wetting agents, dispersion stabilizers, strike-through inhibitors and antifoaming agents; further adherence promoters, cross-linking agents, plasticisers, photoinitiators, light stabilizers, deodorants, biocides, laking agents and chelating agents.

Such additives are usually used in amounts of from 0 to 10% by weight, particularly from 0 to 5% by weight, and preferably from 0.01 to 2% by weight, based on the total weight of the printing ink composition.

Other final printing inks can also be manufactured using the pigment product specified hereinbefore, e.g. publication gravure, flexographic, letterpress or lithographic printing processes. For lithographic printing processes all types of lithographic printing inks known in the art, e.g. heatset, coldset, sheetfed or uv-curing printing inks can be used. The use of the printing inks and the printing processes are further objects of the present invention.

The final printing inks obtainable according to the present invention lead to an overall good printing performance and produce prints of unexpectedly increased colour strength, further improved gloss and transparency with all types of said printing processes.

The present invention is hereinafter further described with reference to particular examples thereof. It will be appreciated that these examples ere presented for illustrative purposes and should not be construed as a limitation of the scope of the invention as herein described.

In the following examples, quantities are expressed as part by weight or percent by weight, if not otherwise indicated.

EXAMPLE 1

C.I. Pigment Red 57:1

7.5 g (0.021 mol) of fumaric modified rosin, (Pinerez® SM3096—Eka Nobel) is dissolved in a solution of sodium hydroxide liquor (5.3 g, 50%, 0.06 mol) in water (175 ml) at 80° C. Upon dissolution, the temperature of the solution is lowered by the addition of ice to 50° C. 2-hydroxy-3-carboxy-naphthalene (36.6 g, 0.195 mol) is then added to the solution with sodium hydroxide liquor (17.1 g, 50%, 0.21 mol) with a further addition of water (360 ml). On dissolution, the solution is cooled to 20° C. by the addition of an ice and water mix, 2-naphthol-6-sulphonic acid (2.1 g, 9.4 mmol) and sodium hydroxide (9.25 g, 50%, 0.115 mol) are added to the vessel and the solution made up to 1000 ml by addition of water. The solution is then cooled to 8° C. prior to coupling.

2-Amino-5-methyl benzenesulphonic acid (36.3 g, 0.194 mot) and 2-aminonaphthalene sulphonic acid (0.41 g, 1.8 mmol) are dissolved in a solution of sodium hydroxide liquor (16.95 g, 50%, 0.211 mol) in water (310 ml) at 40° C. The temperature of the solution is then lowered to 0° C. by addition of ice and sodium nitrite (13.3 g, 0.192 mol) is added to the solution. After a five minute stir, concentrated hydrochloric acid (43.7 g, 36%; 0.43 mol) is added to the solution. The temperature rise of the diazotisation reaction is controlled below 10° C. by the addition of ice. Further sodium nitrite is added if necessary to complete the reaction and to ensure a slight excess of nitrous acid. The volume of the suspension is adjusted to 700 ml at 0-5° C. by ice addition.

The coupling is then carried out via the addition of the diazotised slurry directly to the resin/coupling component solution over 30 minutes with mechanical agitation. The temperature is maintained at 8° C. The pH at the start of the coupling is pH 13.2. Once the coupling proceeds, the pH begins to drop and at pH 11.4 the pH is then maintained with addition of dilute sodium hydroxide.

After the coupling has been completed and the dyestuff has been stirred for 30 minutes to ensure homogeneity, calcium chloride (30.96 g; 0.278 mol) is then added to the mixture to lake the product at pH 11.4 and 8° C. After stirring for a further 30 minutes, the pigment slurry is adjusted with 10% dilute hydrochloric acid to pH 9.0 at which point cocoamine (Armeen® C—Akzo Nobel, 2.65 g, 14.3 mmol) dissolved in a solution of acetic acid (1.0 g, 16.6 mmol) in water (25 ml) is added to the slurry. The pH drops to pH 7.8. The pH is then adjusted with 10% dilute hydrochloric to pH 7.4. The slurry is then heated to 75° C. and held at this temperature for 10 minutes. The suspension is then cooled to 65° C. by adding water.

The pigment is then removed from the slurry by filtration, washed salt free, granulated and dried at 90° C. for 20 hours. Yield of 85.0 g (96% of theory). The dried pigment is then milled and sieved through a 500 micron sieve prior to applicational testing.

In this example, the pigment thus obtained is then tested in the following manner: 21 g of pigment are mixed with 31 g of nitrocellulose varnish and 48 g of ethanol. The mixture is hand mixed in a 250 ml polyethylene container, which contains 200 g of 1.7-2 mm glass beads. The container is then sealed with a lid and polyethylene tape and dispersed on a Skandex disperser for 45 minutes to produce the millbase ink. The millbase ink is separated from the glass beads via Et sieving procedure. The viscosity of the millbase ink is then measured through a Shell Cup No. 4.

Assessment of the ink properties is made by reducing 24 g of the millbase ink with 11.5 g of an ethanol/ethyl acetate solvent blend and a further 14.7 g addition of nitrocellulose varnish. The ink is then drawn down onto non-absorbing substrates using a K-bar. When the prints are dry the strength, shade, gloss and transparency are all measured visually. The ink viscosity is measured through a Shell Cup No. 3.

The colouristics of an ink prepared using the pigment manufactured in Example 1 (Armeen® C containing) are equivalent to the colouristics of the ink manufactured from the comparative pigment in Example 5.

However, the ink millbase flow of the Example 1 product is significantly more fluid than the Example 5 product. The results of the millbase flow measurements are illustrated in Table 1.

EXAMPLE 2

A pigment is prepared as in Example 1, except that 2.65 g of tallow amine (Armeen® HT) is substituted for Armeen® C. When incorporated into a nitrocellulose varnish system and tested as in Example 1, this sample shows equivalent ink colouristics and significantly improved ink millbase flow compared to the ink comprising the product manufactured from the amine free process described in Example 5 (see Table 1).

EXAMPLE 3

A pigment is prepared as in Example 1, except that 2.65 g of oleyl amine (Armeen® O) is substituted for Armeen® C. When incorporated into a nitrocellulose varnish system and tested as in Example 1, this sample shows equivalent ink colouristics and significantly improved ink millbase flow compared to the ink comprising the product manufactured from the amine free process described in Example 5 (see Table 1).

EXAMPLE 4

A pigment is prepared as in Example 1, except that 2.65 g of oleyl dipropylenetriamine (Triameen® OV) is substituted for Armeen® C. When incorporated into a nitrocellulose varnish system and tested as in Example 1, this sample shows equivalent ink colouristics and improved ink millbase flow compared to the ink comprising the product manufactured from the amine free process described in Example 5 (see Table 1).

EXAMPLE 5

Comparative Example

A pigment is prepared as in Example 1, except that there is no amine acetate solution added to the resinated pigment slurry. After the calcium is added to the dyestuff at pH 11.4 and 8° C., the pH is lowered to pH 7.4 with dilute hydrochloric acid (no amine acetate addition) and the pigment slurry is then heat treated and finished as in Example 1. When incorporated into a nitrocellulose varnish system and tested as in Example 1, the colouristics of the ink are equivalent to the amine treated products described in Examples 1-4 but the ink millbase flow is significantly poorer compared to amine treated products described in Examples 1-4 (slower flow through Shell Cup 4).

Results are given in Table 1.

TABLE 1

Comparison of relative ink millbase flow times of products described in Examples 1-5.

| Pigment Composition | Additive | Relative Millbase Flow Time (%) |
|---|---|---|
| Example 1 | Cocoamine | 51 |
| Example 2 | Tallowamine | 49 |
| Example 3 | Oleylamine | 48 |
| Example 4 | Oleyl dipropylenetriamine | 70 |
| Example 5 (comparative) | No additive | 100 |

EXAMPLE 6

C.I. Pigment Red 57:1

7.5 g (0.021 mol) of fumaric modified rosin, (Pinerez® SM3096—Eka Nobel) is dissolved in a solution of sodium hydroxide liquor (5.3 g, 50%, 0.06 mol) in water (175 ml) at 80° C. Upon dissolution, the temperature of the solution is lowered by the addition of ice to 50° C. 2-hydroxy-3-carboxy-naphthalene (38.7 g, 0.205 mol) is then added to the solution with sodium hydroxide liquor (17.1 g, 50%, 0.21 mol) with a further addition of water (360 ml). On dissolution, the solution is cooled to 20° C. by the addition of an ice and water mix, sodium hydroxide (9.25 g, 50%, 0.115 mol) is added to the vessel and the solution made tip to 1000 ml by the addition of water. The solution is then cooled to 8° C. prior to coupling.

2-amino-5-methyl benzenesulphonic acid (36.3 g, 0.194 mol) and 2-aminonaphthalene sulphonic acid (0.41 g, 1.8 mmol) are dissolved in a solution of sodium hydroxide liquor (16.95 g, 50%, 0.211 mol) in water (310 ml) at 40° C. The temperature of the solution is then lowered to 0° C. by addition of ice and sodium nitrite (13.3 g, 0.192 mol) is added to the solution. After a five minute stir, concentrated hydrochloric acid (43.7 g, 36%; 0.43 mol) is added to the solution. The temperature rise of the diazotisation reaction is controlled below 10° C. by the addition of ice. Further sodium nitrite is added if necessary to complete the reaction and to ensure a slight excess of nitrous acid. The volume of the suspension is adjusted to 700 ml at 0-5° C. by ice addition.

The coupling is then carried out via the addition of the diazotised slurry directly to the resin/coupling component solution over 30 minutes with mechanical agitation. The temperature is maintained at 8° C. The pH at the start of the coupling is pH 13.2. Once the coupling proceeds, the pH begins to drop and at pH 11.4 the pH is then maintained with addition of dilute sodium hydroxide.

After the coupling has been completed and the dyestuff has been stirred for 30 minutes to ensure homogeneity, calcium chloride (30.96 g; 0.278 mol) is then added to the mixture to lake the product at pH 11.4 and 8° C. After stirring for a further 30 minutes, the pigment slurry is adjusted with 10% dilute hydrochloric acid to pH 9.0 at which point cocoamine (Armeen® C—Akzo Nobel, 2.65 g, 14.3 mmol) dissolved in a solution of acetic acid (1.0 g, 16.6 mmol) in water (25 ml) is added to the slurry. The pH drops to pH 7.8. The pH is then adjusted with 10% dilute hydrochloric to pH 7.4. The slurry is then heated to 75° C. and held at this temperature for 10 minutes. The suspension is then cooled to 65° C. by adding water.

The pigment is then removed from the slurry by filtration, washed salt free, granulated and dried at 90° C. for 20 hours. Yield of 86.0 g (96% of theory). The dried pigment is then milled and sieved through a 500 micron sieve prior to applicational testing. The applicational testing is carried out as that described in Example 1.

The colouristics of an ink prepared using the pigment manufactured in Example 6 (Armeen® C containing) are equivalent to the colouristics of the ink manufactured from the comparative pigment in Example 9.

However, the ink millbase flow of the Example 6 product is significantly more fluid than the Example 9 product. The results of the millbase flow measurements are illustrated in Table 2.

EXAMPLE 7

A pigment is prepared as in Example 6, except that 2.65 g of tallow amine (Armeen® HT) is substituted for Armeen® C. When incorporated into a nitrocellulose varnish system and tested as in Example 6, this sample shows equivalent ink colouristics and significantly improved ink millbase flow compared to the ink comprising the product manufactured from the amine free process described in Example 9 (see Table 2).

EXAMPLE 8

A pigment is prepared as in Example 6, except that 2.65 g of oleyl amine (Armeen® O) is substituted for Armeen® C. When incorporated into a nitrocellulose varnish system and tested as in Example 6, this sample shows equivalent ink colouristics and significantly improved ink millbase flow to the ink comprising the product manufactured from the amine free process described in Example 9 (see Table 2).

EXAMPLE 9

Comparative Example

A pigment is prepared as in Example 6, except that there is no amine acetate solution added to the resinated rubine slurry. After the calcium is added to the dyestuff at pH 11.4 and 8° C., the pH is lowered to pH 7.4 with dilute hydrochloric acid (no amine acetate addition) and the pigment slurry is then heat treated and finished as in Example 6. When incorporated into a nitrocellulose varnish system and tested as in Example 6, the colouristics of the ink are equivalent to the amine treated products described in Examples 6-8 but the ink millbase flow is significantly poorer (slower flow through Shell Cup 4). Results are given in Table 2.

TABLE 2

Comparison of relative ink millbase flow times of products described in Examples 6-9.

| Pigment Composition | Additive | Relative Millbase Flow Time (%) |
|---|---|---|
| Example 6 | Cocoamine | 51 |
| Example 7 | Tallowamine | 49 |
| Example 8 | Oleylamine | 40 |
| Example 9 (comparative) | No additive | 100 |

EXAMPLE 10

A pigment is prepared as in Example 1, except that 2.00 g of cocoamine (Armeen® C) is used.

EXAMPLE 11

A pigment is prepared as in Example 2, except that 2.00 g of tallow amine (Armeen® HT) is used.

EXAMPLE 12

A pigment is prepared as in Example 3, except that 2.00 g of oleyl amine (Armeen® O) is used.

EXAMPLE 13

A pigment is prepared as in Example 4, except that 2.00 g of oleyl dipropylenetriamine (Triameen® OV) is used.

EXAMPLE 14

A pigment is prepared as in Example 6, except that 2.00 g of cocoamine (Armeen® C) is used.

EXAMPLE 15

A pigment is prepared as in Example 7, except that 2.00 g of tallow amine (Armeen® HT) is used.

EXAMPLE 16

A pigment is prepared as in Example 8, except that 2.00 g of oleyl amine (Armeen® O) is used.

EXAMPLE 17

A pigment is prepared as in Example 1, except that 0.45 g of cocoamine (Armeen® C) is used.

EXAMPLE 18

A pigment is prepared as in Example 2, except that 0.45 g of tallow amine (Armeen® HT) is used.

EXAMPLE 19

A pigment is prepared as in Example 3, except that 0.45 g of oleyl amine (Armeen® O) is used.

EXAMPLE 20

A pigment is prepared as in Example 4, except that 0.45 g of oleyl dipropylenetriamine (Triameen® OV) is used.

The invention claimed is:

1. A process for the preparation of a metal containing organic pigment composition which comprises treating the pigment at temperatures of from 40 to 95° C. for a time period of 5 to 30 minutes, before isolation and drying, with 0.1 to 7.5% by weight, based on the calculated weight of the pigment to be obtained, of an aliphatic amine with from 6 to 22 carbon atoms in the aliphatic chain, wholly or partly as a free base, and thereafter isolating and drying the composition, with the proviso that when the aliphatic amine has more than one amino group, said aliphatic amine is present in an amount of less than 4% by weight, based on the calculated weight of the pigment to be obtained.

2. The process according to claim 1 wherein the aliphatic amine is a saturated or unsaturated fatty amine of from 6 to 22 carbon atoms in the aliphatic chain, or a mixture thereof.

3. The process according to claim 1 wherein the amount of the aliphatic amine is from 0.5 to 4%, by weight, based on the calculated weight of the pigment to be obtained.

4. The process according to claim 1 wherein the aliphatic amine is a monoamine.

5. The process according to claim 1 wherein the metal containing organic pigment is a monoazo, azomethine, phthalein, anthraquinone, phthalocyanine, or triphenylmethane metal complex pigment, or a mixture thereof.

6. The process according to claim 5 wherein the metal containing organic pigment is a β-naphthol, 2-hydroxy-3-carboxy naphthalene (BONA), naphthol AS or naphthalene sulfonic acid monoazo pigment lake, or a mixture of monoazopigment lakes.

7. The process according to claim 1 which comprises additional treatment of the pigment, during or after synthesis of the pigment with a resin in an amount of 1 to 30% by weight, based on the weight of the pigment.

8. A pigmented liquid ink concentrate (millbase ink) comprising a metal containing organic pigment in an amount of 15% to 40% by weight, based on the weight of the pigmented liquid ink concentrate, wherein said liquid ink concentrate is obtained by dispersing a metal containing organic pigment composition in an ink varnish/solvent combination (ink vehicle) which metal containing organic pigment composition comprises the metal containing organic pigment, 0.1 to 7.5% by weight based on the weight of the pigment of an aliphatic amine with from 6 to 22 carbon atoms in the aliphatic chain, wholly or partly as a free base, and 3 to 10% by weight based on the weight of the pigment of a resin, and which pigment composition is obtained by treating the pigment at temperatures of from 40 to 95° C. for a time period of 5 to 30 minutes, before isolation and drying, with 0.1 to 7.5% by weight, based on the calculated weight of the pigment to be obtained, of the aliphatic amine wholly or partly as a free base, and thereafter isolating and drying the composition, with the proviso that when the aliphatic amine has more than one amino group, said aliphatic amine is present in an amount of less than 4% by weight, based on the calculated weight of the pigment to be obtained, wherein the pigment is treated either during or after synthesis of the pigment with a resin in an amount of 3 to 10% by weight, based on the weight of the pigment.

9. A process for the preparation of a printing ink which comprises reducing pigment loading of the pigmented liquid ink concentrate (millbase ink) according to claim 8 with an ink vehicle comprising an ink varnish and a solvent.

10. The printing ink obtained according to the process of claim 9, wherein the pigment is comprised in an amount of 1% to 15% by weight, based on the weight of the printing ink.

* * * * *